United States Patent
Wieduwilt et al.

(10) Patent No.: US 6,811,024 B2
(45) Date of Patent: Nov. 2, 2004

(54) CONVEYOR APPARATUS FOR ITEMS IN PACKAGING MACHINES

(75) Inventors: Ulrich Wieduwilt, Schwaebisch Gmuend (DE); Johann Zeller, Asperg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/332,824

(22) PCT Filed: May 10, 2002

(86) PCT No.: PCT/DE02/01688
§ 371 (c)(1),
(2), (4) Date: Jun. 13, 2003

(87) PCT Pub. No.: WO02/092478
PCT Pub. Date: Nov. 21, 2002

(65) Prior Publication Data
US 2004/0023769 A1 Feb. 5, 2004

(30) Foreign Application Priority Data
May 12, 2001 (DE) .......................... 101 23 220

(51) Int. Cl.[7] ............................................ B65G 29/00
(52) U.S. Cl. .............................. 198/867.08; 198/803.13
(58) Field of Search ........................ 198/867.08, 803.13

(56) References Cited
U.S. PATENT DOCUMENTS

| | | | | | |
|---|---|---|---|---|---|
| 2,358,292 | A | * | 9/1944 | Malhiot ................. | 198/803.11 |
| 3,365,051 | A | * | 1/1968 | Clyde et al. ................. | 198/833 |
| 4,893,707 | A | * | 1/1990 | Langen et al. ............ | 198/626.3 |
| 5,099,978 | A | * | 3/1992 | Santandrea et al. ...... | 198/345.1 |
| 5,115,901 | A | * | 5/1992 | Santandrea et al. ...... | 198/345.3 |
| 5,163,543 | A | * | 11/1992 | Gambetti ................. | 198/419.3 |
| 5,188,219 | A | * | 2/1993 | Mitsumoto .................. | 198/834 |
| 5,303,810 | A | * | 4/1994 | Tani ........................ | 198/345.3 |
| 5,346,058 | A | * | 9/1994 | Santandrea et al. .... | 198/867.08 |
| 5,407,059 | A | * | 4/1995 | Fochler .................... | 198/626.5 |
| 5,474,166 | A | * | 12/1995 | Santandrea et al. ...... | 198/345.3 |
| 6,260,690 | B1 | * | 7/2001 | Batzer ...................... | 198/626.5 |
| 6,269,937 | B1 | * | 8/2001 | Dietrich et al. .......... | 198/484.1 |
| 6,464,067 | B1 | * | 10/2002 | Reist ........................ | 198/465.4 |
| 6,739,821 | B2 | * | 5/2004 | Levis-Thorne et al. ..... | 414/234 |

* cited by examiner

Primary Examiner—Christopher P Ellis
Assistant Examiner—Rashmi Sharma
(74) Attorney, Agent, or Firm—Ronald E. Greigg

(57) ABSTRACT

A conveyor apparatus for folding boxes in a boxing machine has conveyor chains which are respectively supported in pairs in a guide rail and have pusher lugs attached to them, between which the folding boxes are contained in a positively engaging fashion. To permit adjustment of the conveyor apparatus with regard to different box widths and box lengths, the conveyor chains are respectively coupled to cross sectionally polygonal shafts. The format adaptation to different folding box widths is permitted by means of a self-locking adjusting mechanism, for a simple format adaptation in terms of the folding box length, according to the invention it is necessary that the gears that are operationally connected to the one guide rail be disposed on the respective shaft in a rotationally fixed, but movable fashion.

20 Claims, 2 Drawing Sheets

CONVEYOR APPARATUS FOR ITEMS IN PACKAGING MACHINES

CROSS-REFERENCE TO RELATED APPLICATIONS

This application is a 35 USC 371 application of PCT/DE 02/01688 filed on May 10, 2002.

BACKGROUND OF THE INVENTION

1. Field of the Invention

The invention relates to a conveyor apparatus for conveying items in packaging machines.

2. Description of the Prior Art

One conveyor apparatus of the type with which this invention is concerned is known from EP 0 485 762 B1. In the known conveyor apparatus for folding boxes, the pusher lugs are disposed on endlessly revolving conveyor chains. In the two turnaround points, the conveyor chains are supported on chain wheels, which are in turn connected to a hub and to a hollow shaft disposed concentric to the hub. The angular position of the one hub in relation to its hollow shaft can be adjusted and fixed by means of a self-locking mechanism in order to permit a format adaptation with regard to the folding box width. In addition, the two hubs are connected to each other by means of a common support whose position can be adjusted lateral to a rear frame wall in order to thus permit an adaptation with regard to various folding box lengths. Due to its embodiment as a hub and a hollow shaft disposed concentrically around the hub, the known adjusting mechanism for adapting to various folding box widths is relatively expensive since the hollow shaft must be complex in design in order to be able to fulfill both the drive function and the adjusting function.

SUMMARY OF THE INVENTION

The conveyor apparatus according to the invention for items in packaging machines has the advantage over the prior art that it is embodied in a relatively simple fashion. According to the invention, this is essentially achieved in that two parallel adjusting shafts are provided, which are coupled to each other and to the self-locking mechanism by means of a transmission mechanism.

BRIEF DESCRIPTION OF THE DRAWINGS

An exemplary embodiment of the invention will be explained in detail below, in conjunction with the drawings, in which.

DESCRIPTION OF THE PREFERRED EMBODIMENT

Figure 1:
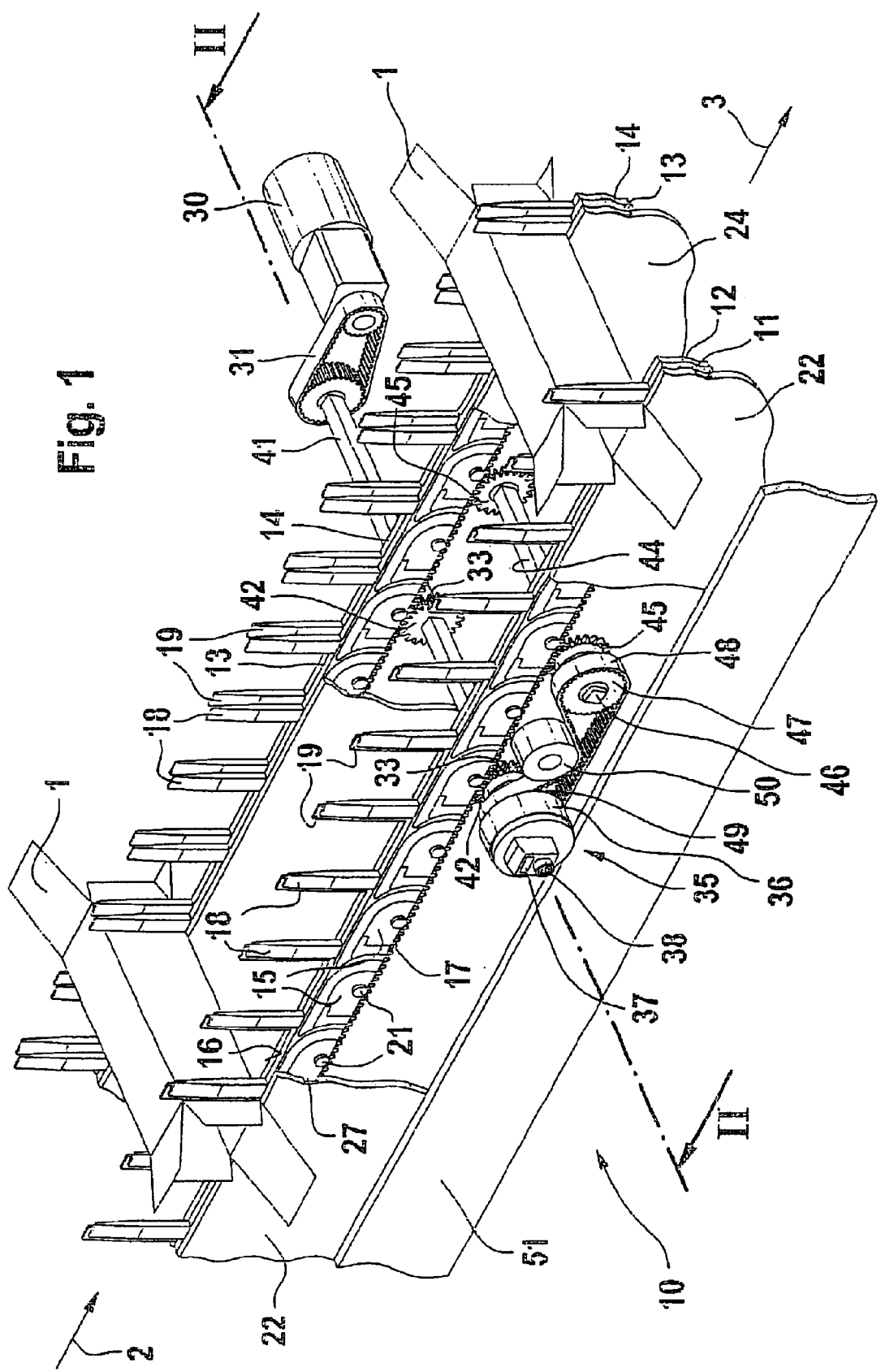
FIG. 1 shows a simplified perspective view of a part of a conveyor apparatus according to the invention.
Figure 2:
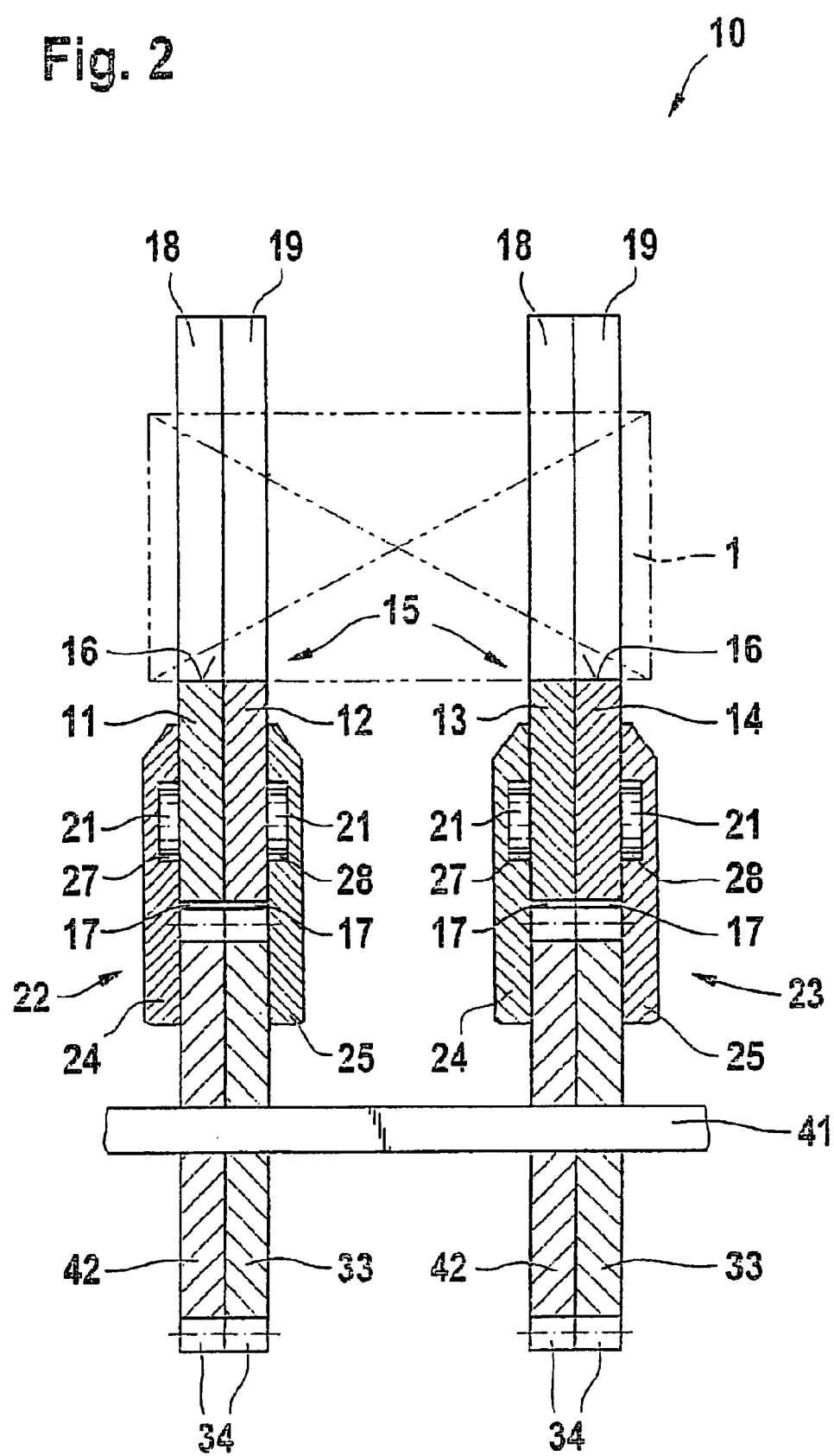
FIG. 2 shows a partial section in the vicinity of the drive shaft of the conveyor apparatus in FIG. 1.

The conveyor apparatus 10 depicted in the drawings is used to transport folding boxes 1 inside a boxing machine. A transfer device, not shown, introduces the folding boxes 1 into the conveyor apparatus 10 in an infeed region 2 and the conveyor apparatus 10 continuously conveys them in the transport direction 3. During transport, a packaging product, for example a blister strip, is inserted into the folding boxes 1. A boxing machine of this kind has been disclosed, for example, by DE 44 16 891 A1 and the transfer of folding boxes into a conveyor apparatus of this generic type has been disclosed, for example, in DE 199 20 495 A1. Neither the boxing machine nor the transfer device are essential to the invention and are therefore not discussed further.

The conveyor apparatus 10, whose principle design has already been described in DE 197 31 084 A1, has a total of four parallel conveyor chains 11 to 14. Of the conveyor chains 11 to 14, two conveyor chains 11, 12 and 13, 14 respectively rest with their side surfaces sliding against each other and the distance of the conveyor chains 11, 12 from the conveyor chains 13, 14 is adapted to the length of the folding boxes 1. The conveyor chains 11 to 14 are comprised of chain links 15 connected to one another in an overlap region, which are essentially plate-shaped and whose underside has a gearing 17 embodied on it. The top 16 of the chain links 15 have pusher lugs 18, 19 protruding upward from them, between which the folding boxes 1 are respectively held with positive engagement; in the following, the pusher lugs 18 of the conveyor chains 11, 13 are referred to as the leading pusher lugs and the pusher lugs 19 of the conveyor chains 12, 14 are referred to as the trailing pusher lugs. On the sides with which the adjoining conveyor chains 11, 12 and 13, 14 do not rest against each other, the pins used to attach the chain links 15 to one another extend outward in the form of guide pins 21.

The conveyor chains 11, 12 and 13, 14 are embraced in pairs by strip-shaped guide rails 22, 23, each of which extends to just under the top 16 of the chain links 15. These guide rails 22, 23 each have two side walls 24, 25, which rest against the respective conveyor chain 11, 12 and 13, 14, on the side with the guide pins 21. The guide pins 21 are in turn guided in a guide groove 27, 28 in the guide rails 22, 23. Parallel to the upper transport track and parallel to the guide grooves 27, 28, additional guide grooves, not shown, are provided in the side walls 24, 25 so that except for their guide mechanism-free turnaround regions, the endlessly revolving conveyor chains 11 to 14 are always guided in the two guide rails 22, 23. The conveyor chains 11 to 14 are driven continuously or cyclically by means of a drive motor 30, which uses a toothed belt 31 to drive a polygonal drive shaft 41, which supports drive gears 33, 42, whose gearings 34 engage with the gearings 17 of the chain links 15.

In order to be able to adapt the conveyor apparatus 10 to different folding box widths, it is necessary to be able to adjust the position of the leading pusher lugs 18 in relation to the trailing pusher lugs 19 and consequently the conveyor chains 11, 13 in relation to the conveyor chains 12, 14. To that end, a self-locking adjusting mechanism 35 is provided, which has two concentrically disposed parts that can be adjusted in relation to each other. The adjusting mechanism 35 preferably constituted by the Harmonic Drive® type has a housing 36 embodied without undercuts; on the side oriented toward the operator, a counter 37 is provided to indicate the currently set position of the conveyor chains 11 to 14 or a corresponding folding box width, as well as an opening 38 for an adjusting device by means of which the position of the conveyor chains 11 to 14 in relation to each other can be adjusted as desired.

The one part of the adjusting mechanism 35 is connected to the preferably square drive shaft 41. The drive shaft 41 supports the two gears 42 in a rotationally fixed manner. Each gear 42 has a respective seat adapted to the cross section of the drive shaft 41. The two gears 42 and their gearings engage with the gearings 17 of the two conveyor chains 11 and 13. Parallel to and spaced apart from the drive shaft 41, a shaft 44 is provided, which is embodied identically to the drive shaft 41. The shaft 44 likewise supports two gears 45, but their gearings engage with the gearings 17 of the conveyor chains 12 and 14. The gears 42 and 45 are each supported in the guide rails 22, 23, each aligned with the associated conveyor chain 11 to 14. On the side of the adjusting mechanism 35, the shaft 44 extends beyond the guide rail 22. The corresponding shaft end 46 supports a crown gear 47. The crown gear 47 has a toothed belt 48 wound around it, which is connected to an adapter 49 that concentrically encompasses the drive shaft 41 and adjoins the housing 36 with almost no gap. The adapter 49 cooperates with the second part of the adjusting mechanism 35, which can be adjusted in relation to the first part and consequently in relation to the drive shaft 41 by means of the opening 38. Between the adapter 49 and the crown gear 47, a tensioning device 50 is also connected to the guide rail 22 and serves to adjust the tension of the toothed belt 48.

If the adjusting mechanism 35 is actuated via the opening 38, then the adapter 49 is rotated in relation to the drive shaft 41. The toothed belt 48 and the crown gear 47 transmit the rotational movement to the shaft 44, whose angular position consequently changes in relation to the drive shaft 41. Since the two shafts 41, 44 are coupled by means of the gears 42, 45 to the respective conveyor chains 11, 13 and 12, 14, then the position of the pusher lugs 18, 19 in relation to one another consequently also changes, which makes it possible to adapt the format to different folding box widths.

In order to permit an adaptation to different folding box lengths, it is necessary to be able to adjust the distance of the guide rails 22, 23 from each other. To that end, the front guide rail 22 oriented toward the operator is disposed in stationary fashion on the frame 51 of the conveyor apparatus 10. By contrast, the rear guide rail 23 is supported so that it can move parallel to the front guide rail 22; the adjustment is executed, for example, by means of a spindle actuator or by means of an electric drive unit. In this connection, it is essential that the gears 42, 45 are in fact fastened to their respective shafts 41, 44 in a rotationally fixed fashion, but can be moved on the shafts 41, 44. Since the gears 42, 45 are also supported in the guide rails 22, 23, when the rear guide rail 23 is adjusted in relation to the front guide rail 22, the gears 42, 45 are necessarily slid along with it on their shafts 41, 44.

If, as described just above, the front guide rail 22 is disposed in stationary fashion, during a format adaptation, naturally the gears 42, 45 disposed in the guide rail 22 do not have to be disposed in a movable fashion on their respective shafts 41, 44, but can also be rigidly connected to the shafts 41, 44. In specific uses in which the adjustment of the conveyor chains 11 to 14 and the guide rails 22 and 23 must be adjusted symmetrically in relation to each other, however, all of the gears 42, 45 must be disposed in a movable fashion on their associated shafts 41, 44.

The foregoing relates to preferred exemplary embodiments of the invention, it being understood that other variants and embodiments thereof are possible within the spirit and scope of the invention, the latter being defined by the appended claims.

What is claimed is:

1. A conveyor apparatus (10) for folding boxes (1) in boxing machines, the conveyor apparatus comprising
    parallel conveyor chains (11 to 14) equipped with pusher lugs (18, 19) whereby a box (1) may be contained with positive engagement between leading and trailing pusher lugs (18, 19) of the conveyor chains (11 to 14), the position of the conveyor chains (11 to 14) and consequently of the pusher lugs (18, 19) in relation to one another being adjustable to adapt the format by means of a self-locking mechanism (35),
    the conveyor chains (11 to 14) connected to the leading pusher lugs (18) and those connected to the trailing pusher lugs (19) being respectively coupled to a cross sectionally polygonal adjusting shaft (41, 44) disposed in a stationary fashion in the housing frame (51), the adjusting shafts (41, 44) each supporting one adjusting element (42, 45) that is stationary and one that is disposed in a positively engaging fashion and can be moved on the adjusting shaft (41, 44), which adjusting elements (42, 45) cooperate with the conveyor chains (11 to 14) to move the chains in relation to one another, one adjusting shaft (41) supporting the self-locking mechanism (35) and being coupled to it, and the other adjusting shaft (44) being connected to the self-locking mechanism (35) by means of a transmission mechanism (47, 48, 49).

2. The conveyor apparatus according to claim 1, wherein on the side of the stationary adjusting elements (42, 45), the adjusting shafts (41, 44) extend beyond the stationary adjusting elements (42, 45), and wherein the adjusting mechanism (35) and the transmission mechanism (47, 49) are disposed on the extended shaft ends.

3. The conveyor apparatus according to claim 1, wherein the adjusting elements are gears (42, 45), whose gearing positively engages with teeth (17) of the conveyor chains (11 to 14), wherein the gear (42, 45) that can move on the respective adjusting shaft (41, 44) has a polygonal seat adapted to the cross section of the adjusting shaft (41, 44), wherein the movable gears (42, 45) are guided in a rail (22, 23), which can be moved lateral to the adjusting shafts (41, 44) for a format adaptation, and wherein the rail (22, 23) is embodied as a support for the conveyor chains (11 to 14).

4. The conveyor apparatus according to claim 2, wherein the adjusting elements are gears (42, 45), whose gearing positively engages with teeth (17) of the conveyor chains (11 to 14), wherein the gear (42, 45) that can move on the respective adjusting shaft (41, 44) has a polygonal seat adapted to the cross section of the adjusting shaft (41, 44), wherein the movable gears (42, 45) are guided in a rail (22, 23), which can be moved lateral to the adjusting shafts (41, 44) for a format adaptation, and wherein the rail (22, 23) is embodied as a support for the conveyor chains (11 to 14).

5. The conveyor apparatus according to claim 1, wherein the transmission mechanism includes a toothed belt (48), which on the one hand is coupled to a crown gear (47) disposed on one of the two adjusting shafts (41, 44) and on the other hand is coupled to a part (49) of the adjusting mechanism (35), wherein the crown gear (47) can rotate in relation to the adjusting shaft (41) supporting the self-locking mechanism (35) and is rotationally fixed in relation to the other adjusting shaft (44).

6. The conveyor apparatus according to claim 2, wherein the transmission mechanism includes a toothed belt (48), which on the one hand is coupled to a crown gear (47) disposed on one of the two adjusting shafts (41, 44) and on the other hand is coupled to a part (49) of the adjusting mechanism (35), wherein the crown gear (47) can rotate in relation to the adjusting shaft (41) supporting the self-locking mechanism (35) and is rotationally fixed in relation to the other adjusting shaft (44).

7. The conveyor apparatus according to claim 3, wherein the transmission mechanism includes a toothed belt (48), which on the one hand is coupled to a crown gear (47) disposed on one of the two adjusting shafts (41, 44) and on the other hand is coupled to a part (49) of the adjusting mechanism (35), wherein the crown gear (47) can rotate in relation to the adjusting shaft (41) supporting the self-locking mechanism (35) and is rotationally fixed in relation to the other adjusting shaft (44).

8. The conveyor apparatus according to claim 4, wherein the transmission mechanism includes a toothed belt (48), which on the one hand is coupled to a crown gear (47) disposed on one of the two adjusting shafts (41, 44) and on the other hand is coupled to a part (49) of the adjusting mechanism (35), wherein the crown gear (47) can rotate in relation to the adjusting shaft (41) supporting the self-locking mechanism (35) and is rotationally fixed in relation to the other adjusting shaft (44).

9. The conveyor apparatus according to claim 5, wherein the adjusting shaft (41) supporting the adjusting mechanism (35) is encompassed by the one part (49) that adjoins the housing (36) of the self-locking adjusting mechanism (35) and that the housing (36) is embodied without undercuts.

10. The conveyor apparatus according to claim 6, wherein the adjusting shaft (41) supporting the adjusting mechanism (35) is encompassed by the one part (49) that adjoins the housing (36) of the self-locking adjusting mechanism (35) and that the housing (36) is embodied without undercuts.

11. The conveyor apparatus according to claim 7, wherein the adjusting shaft (41) supporting the adjusting mechanism (35) is encompassed by the one part (49) that adjoins the housing (36) of the self-locking adjusting mechanism (35) and that the housing (36) is embodied without undercuts.

12. The conveyor apparatus according to claim 8, wherein the adjusting shaft (41) supporting the adjusting mechanism (35) is encompassed by the one part (49) that adjoins the housing (36) of the self-locking adjusting mechanism (35) and that the housing (36) is embodied without undercuts.

13. The conveyor apparatus according to claim 1, wherein the self-locking adjusting mechanism (35) is of the Harmonic Drive® type and has a counter (37) for detecting the position of the conveyor chains (11 to 14).

14. The conveyor apparatus according to claim 2, wherein the self-locking adjusting mechanism (35) is of the Harmonic Drive® type and has a counter (37) for detecting the position of the conveyor chains (11 to 14).

15. The conveyor apparatus according to claim 3, wherein the self-locking adjusting mechanism (35) is of the Harmonic Drive® type and has a counter (37) for detecting the position of the conveyor chains (11 to 14).

16. The conveyor apparatus according to claim 5, wherein the self-locking adjusting mechanism (35) is of the Harmonic Drive® type and has a counter (37) for detecting the position of the conveyor chains (11 to 14).

17. The conveyor apparatus according to claim 5, wherein the toothed belt (48) is coupled to a tensioning device (50), which is disposed between the two adjusting shafts (41, 44).

18. The conveyor apparatus according to claim 6, wherein the toothed belt (48) is coupled to a tensioning device (50), which is disposed between the two adjusting shafts (41, 44).

19. The conveyor apparatus according to claim 7, wherein the toothed belt (48) is coupled to a tensioning device (50), which is disposed between the two adjusting shafts (41, 44).

20. The conveyor apparatus according to claim 8, wherein the toothed belt (48) is coupled to a tensioning device (50), which is disposed between the two adjusting shafts (41, 44).

* * * * *

UNITED STATES PATENT AND TRADEMARK OFFICE
CERTIFICATE OF CORRECTION

PATENT NO. : 6,811,024 B2
DATED : November 2, 2004
INVENTOR(S) : Ulrich Wieduwilt et al.

It is certified that error appears in the above-identified patent and that said Letters Patent is hereby corrected as shown below:

<u>Title page,</u>
Item [56], References Cited, FOREIGN PATENT DOCUMENTS, should read as follows:
-- U.S. PATENT DOCUMENTS
   6,012,568   A    Kane    1/2000

FOREIGN PATENT DOCUMENTS

CH    418 956    A    8/1966
   DE    44 16 891   A    11/1995
   DE    197 31 084  A    1/1999
   DE    199 20 495  A    11/2000
   EP    0 485 762   A    5/1992    --

Signed and Sealed this

Twenty-ninth Day of March, 2005

JON W. DUDAS
*Director of the United States Patent and Trademark Office*